US006736256B2

(12) United States Patent
Jobin

(10) Patent No.: US 6,736,256 B2
(45) Date of Patent: May 18, 2004

(54) APPARATUS AND METHOD FOR CONTROLLING A LONGITUDINAL SHIFTING OF AN ELONGATED PIECE ALONG A PREDETERMINED LENGTH

(75) Inventor: Gino Jobin, Normandin (CA)

(73) Assignee: Gemofor Inc., Normandin (CA)

(*) Notice: Subject to any disclaimer, the term of this patent is extended or adjusted under 35 U.S.C. 154(b) by 22 days.

(21) Appl. No.: 10/134,659

(22) Filed: Apr. 25, 2002

(65) Prior Publication Data

US 2002/0194969 A1 Dec. 26, 2002

Related U.S. Application Data

(60) Provisional application No. 60/288,444, filed on May 4, 2001.

(30) Foreign Application Priority Data

Apr. 27, 2001 (CA) .......................................... 2345872

(51) Int. Cl.[7] .............................................. B65G 47/26

(52) U.S. Cl. ............ 198/457.06; 198/456; 198/457.01; 198/370.06

(58) Field of Search ................................ 198/598, 456, 198/457.01, 457.02, 457.06–155, 457.07, 370.06

(56) References Cited

U.S. PATENT DOCUMENTS 1,909,481 A * 5/1933 Allen ......................... 198/598
4,164,248 A * 8/1979 Rysti .......................... 144/312
4,261,236 A * 4/1981 Verjux ........................ 198/689
5,379,879 A * 1/1995 Mantovani et al. ......... 198/382
5,417,265 A * 5/1995 Davenport et al. ......... 198/457
5,509,537 A * 4/1996 Crismon et al. ....... 198/370.07
5,785,102 A * 7/1998 Hamel ........................ 198/434
5,865,080 A * 2/1999 Jackson .......................... 83/74
6,079,545 A * 6/2000 Dombek ..................... 198/458
6,237,742 B1 * 5/2001 Dunwald et al. ........... 198/443
6,311,828 B1 * 11/2001 Newnes et al. ............. 198/456
6,382,067 B1 * 5/2002 Gagnon ...................... 198/456
6,588,575 B1 * 7/2003 Heuft et al. ........... 198/370.07
6,612,420 B1 * 9/2003 Hartness, III et al. ...... 198/597

FOREIGN PATENT DOCUMENTS

CA 2228641 8/1999

OTHER PUBLICATIONS

U.S. Provisional Application 60/076,194.

* cited by examiner

*Primary Examiner*—Douglas Hess
(74) *Attorney, Agent, or Firm*—Milton Oliver, Esq.; Ware Fressola Van Der Sluys & Adolphson LLP

(57) ABSTRACT

The method and apparatus are for controlling a longitudinal shifting of an elongated piece along a predetermined length SL as said piece moves transversely within a plane at a given speed PS. The apparatus comprises a longitudinal arm having a given length PL pivotable within the plane to shift the piece; a flexible link operatively mounted around the arm to contact the piece as the arm is pivoted to shift the piece; a controllable pivoting means for pivoting the arm according to an angle θ determined in relation to the predetermined length SL and the given length PL; and a controllable driving means for driving the flexible link around the arm according to a speed SS determined in relation to the speed PS of the piece and the angle θ so that the longitudinal shifting is controlled.

16 Claims, 14 Drawing Sheets

APPARATUS AND METHOD FOR CONTROLLING A LONGITUDINAL SHIFTING OF AN ELONGATED PIECE ALONG A PREDETERMINED LENGTH

This application claims the benefit of provisional application No. 60/288,444 filed May 4, 2001.

FIELD OF THE INVENTION

The present invention relates to an apparatus and a method for controlling a longitudinal shifting of an elongated piece along a predetermined length as the piece moves transversely within a plane at a given speed. According to a preferred application, the present invention relates to a board positioning apparatus and method for precise saw trimming. Such apparatus is generally mounted in front of a multiple saw trimmer.

DESCRIPTION OF THE PRIOR ART

Known in the art there is a mobile gate system with cylinders. Pneumatic cylinders are used for positioning a mobile gate. Limit switches are used for sensing the position of the gate. The gate is moved to a desired position and a lumber piece is moved against the gate. When the lumber piece is in position, an elongated arm lifts the lumber piece to keep its position for the trimming. One of the drawbacks with this equipment is that the accuracy of the displacement is in relation with the distance between the limit switches. Moreover, the stroke for one cylinder is typically limited to 6" and for an additional displacement, it is then necessary to add another gate. Such system causes a rebound of the lumber piece on the gate and thus an additional imprecision occurs. The maximum speed of this system is generally 100 lumber pieces per minute.

Still according to the prior art, there is known a pivoting gate system with a cylinder. The operation of this system is similar to that of the mobile gate described above. The rebounds are however avoided since the lumber piece has a given continuation with the gate. The cylinders that are used are hydraulic cylinders with position sensors. One of the drawbacks of this equipment is that it requires an extensive maintenance and a high and expensive hydraulic power. The cylinders are also very expensive. The stroke of a cylinder is limited to 6" and for an additional displacement, another gate has to be added. The maximum speed of this system is generally limited to 120 lumber pieces per minute.

Also known in the art, there is the Canadian published application no. 2,228,641 in the name of the applicant, wherein there is described an apparatus for positioning lumber pieces. This Canadian application corresponds to U.S. application Ser. No. 60/076,194. The apparatus comprises several levers mounted in rows. These levers are for slightly lifting the lumber pieces and thus preventing them to be longitudinally displaced by means of the aligning rollers. The lumber pieces are then pushed by means of wedges and slid over the levers. The geometry of the levers prevents abrupt movements of the lumber pieces. A drawback with this apparatus is that it is not compact and consequently requires a large space for its installation. As a matter of fact, when such positioning apparatus is mounted in existing plants, other important equipment may have to be removed to provide the necessary space for the installation of the apparatus.

It is an object of the present invention to provide a method and an apparatus that while compact can process a large number of elongated pieces per minute.

SUMMARY OF THE INVENTION

According to the present invention, there is provided an apparatus for controlling a longitudinal shifting of an elongated piece along a predetermined length SL as said piece moves transversely within a plane at a given speed PS, comprising: a longitudinal arm having a given length PL pivotable within the plane to shift the piece; a flexible strap operatively mounted around the arm to contact the piece as the arm is pivoted to shift the piece; a controllable pivoting means for pivoting the arm according to an angle θ determined in relation to the predetermined length SL and the given length PL; and a controllable driving means for driving the strap around the arm according to a speed SS determined in relation to the speed PS of the piece and the angle θ so that the longitudinal shifting is controlled.

Also according to the present invention, there is provided a method for controlling a longitudinal shifting of an elongated piece along a predetermined length SL as said piece moves transversely within a plane at a given speed PS, comprising steps of: (a) providing a longitudinal arm having a given length PL pivotable within the plane to shift the piece, and a flexible strap operatively mounted around the arm to contact the piece as the arm is pivoted to shift the piece; (b) pivoting the arm according to an angle θ determined in relation to the predetermined length SL and the given length PL of the arm; and (c) driving the strap around the arm according to a speed SS determined in relation to the speed PS of the piece and the angle θ so that the longitudinal shifting is controlled.

DESCRIPTION OF THE DRAWINGS

A non-restrictive description of preferred embodiments of the invention will now be given with reference to the appended figures, wherein.

DETAILED DESCRIPTION OF PREFERRED EMBODIMENTS

Figure 1:
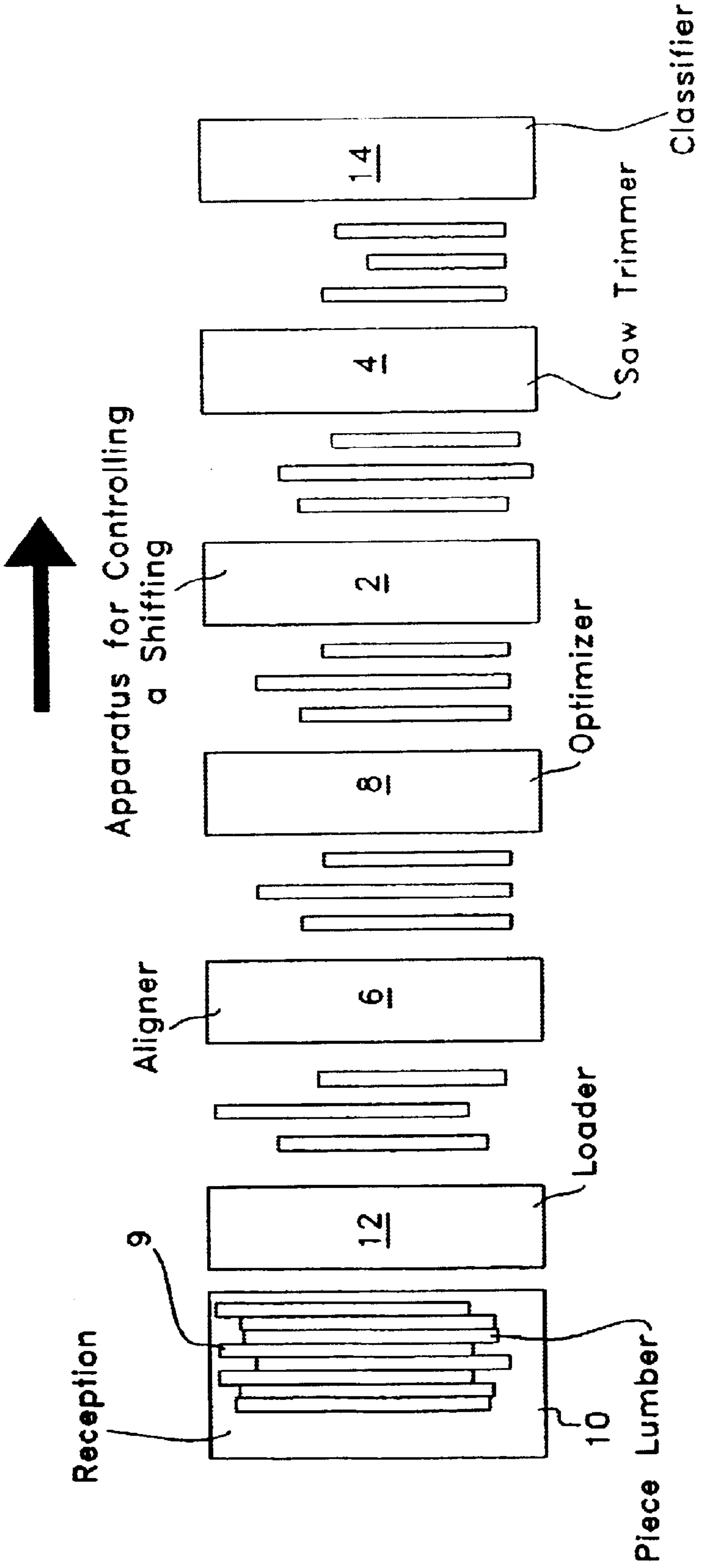
FIG. 1 is a schematic top plan view of an example of a wood process line.
Figure 2:
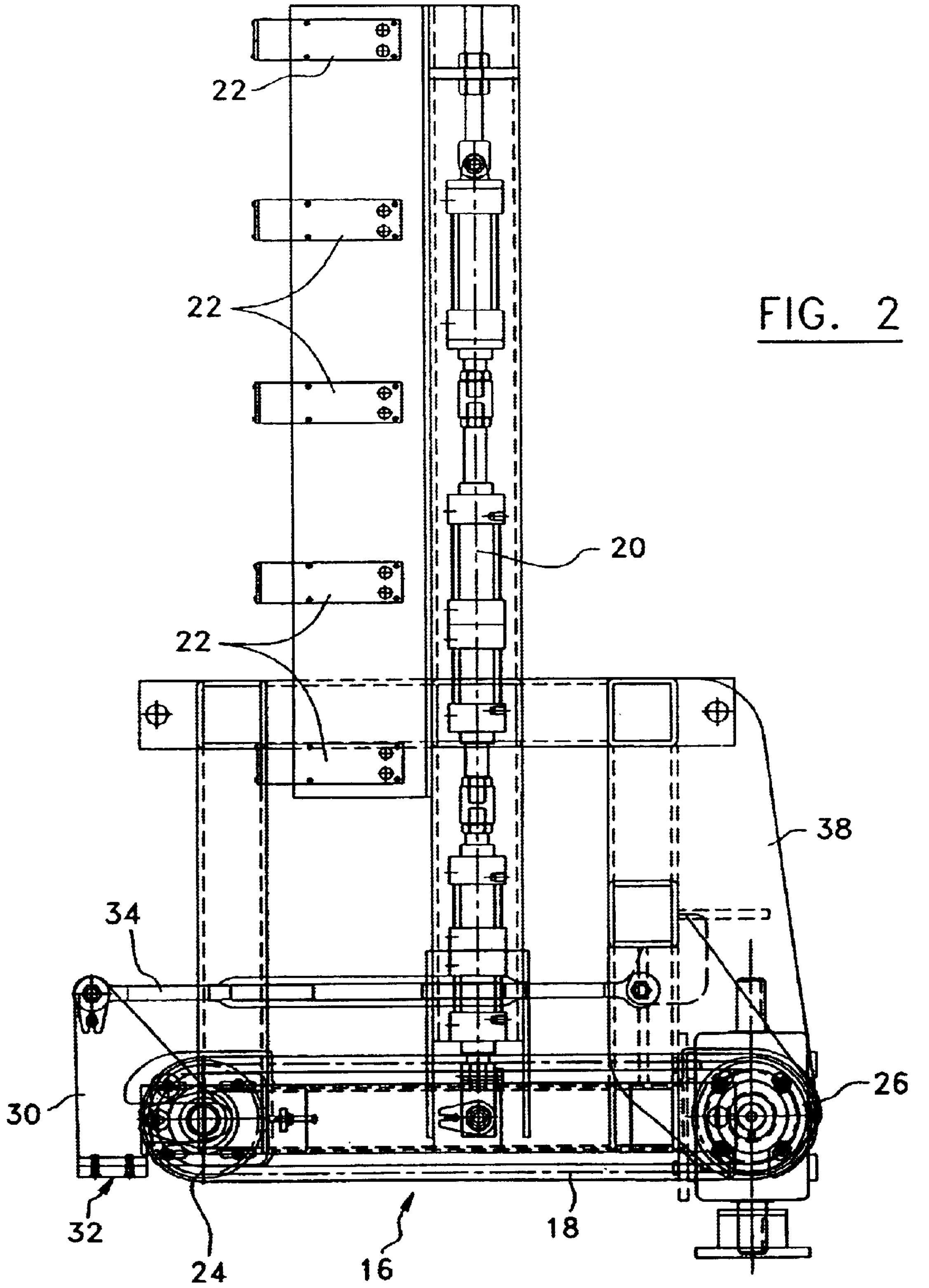
FIG. 2 is a top plan view of first preferred embodiment of the present invention.

Referring now to FIG. 1, the apparatus 2 according to the present invention is advantageously mounted in a process line of a precise trimming just before the saw trimmer 4 and after the aligner 6 which is used to set all the lumber pieces with one of their extremities aligned on a datum line. An optimizer 8 is also provided between the aligner 6 and the apparatus 2. The process line also comprises the reception 10, a loader 12 and a classifier 14. A conveyor moves the lumber pieces through the process line. The arrow indicates the travel direction of the lumber pieces.

Before arriving at the level of the apparatus 2, the lumber piece crosses the aligner 6 which brings back one extremity of each lumber piece aligned with a first datum line of the conveyor. Then the lumber pieces are measured by an electronic controlled device called optimizer 8 which allows the analysis of the lumber pieces in three dimensions. The optimizer 8 detects the length of the lumber pieces, the cross-section thereof such as 2'×4', 2'×6', 2'×8', 1'×3', etc., and the defects. By taking into account each of these parameters, the optimizer makes a decision about the portion of each lumber piece that is usable. The decision takes into consideration the position of the available saws of the saw trimmer. The saws of the saw trimmer are fixed since there is no displacement in the longitudinal direction with reference to the lumber piece. Accordingly, each lumber piece should be positioned to be cut with a minimum loss.

When the analysis of the optimizer 8 is completed, the latter sends the information to an automated system which controls the loader 12, the apparatus 2, the saw trimmer 4 and the classifier 14. The automated system knows at all time where each lumber piece is located and the related information thereabout, namely the distance that the piece must travel in the transversal direction of the conveyor, the saws of the saw trimmer 4 which must be used, and the gate of the classifier 14 that has to be opened so that the lumber pieces be sorted with similar pieces. The longitudinal shifting of the lumber pieces is performed by the apparatus 2.

Referring now to FIGS. 1 to 10, there is shown a first preferred embodiment of an apparatus according to the present invention. The apparatus is for controlling the longitudinal shifting of an elongated piece along a predetermined length SL as it moves transversally within a plane at a given speed PS. Please note that preferably the present invention is applied to lumber pieces but it can be applied to any other kind of elongated pieces.

The apparatus comprises a longitudinal arm 16 having a given length PL pivotable within the travelling plane of the piece 9 to shift it. The apparatus also comprises a flexible link such as for example a strap 18 operatively mounted around the arm 16 to contact the piece 9 as the arm is pivoted to shift it. The apparatus also comprises a controllable pivoting means which comprises for example a pneumatic cylinder 20 with several valves 22. The pneumatic cylinder can be replaced for example by an electric cylinder or a screw activated by a servo-motor. The cylinder 20 with the valves 22 are for pivoting the arm according to an angle $\theta$ determined in relation to the predetermined length SL and the given length PL. Preferably, the pneumatic cylinder 20 has an end pivotally connected to the arm 16. The valves 22 are for controlling movement of the cylinder 20, The apparatus also comprises a controllable driving means which comprises preferably two pulleys 24 and 26 mounted at both ends of the elongated arm 16, one of the pulleys being a driving pulley 26. The controllable driving means is for driving the strap 18 around the arm 16 according to a speed SS determined in relation to the speed PS of the piece and the angle $\theta$ so that the longitudinal shifting is controlled. Preferably, if one wants only a longitudinal shifting of the elongated piece without any lateral displacement, the angle $\theta$ is determined by means of the following equation: $\theta=\text{atan}[SL/PL]$, and the speed SS is determined by means of the equation: $SS=PS/\cos\theta$. The relation between the angle $\theta$ and the distance SL is shown for example in FIG. 6.

Figure 3:
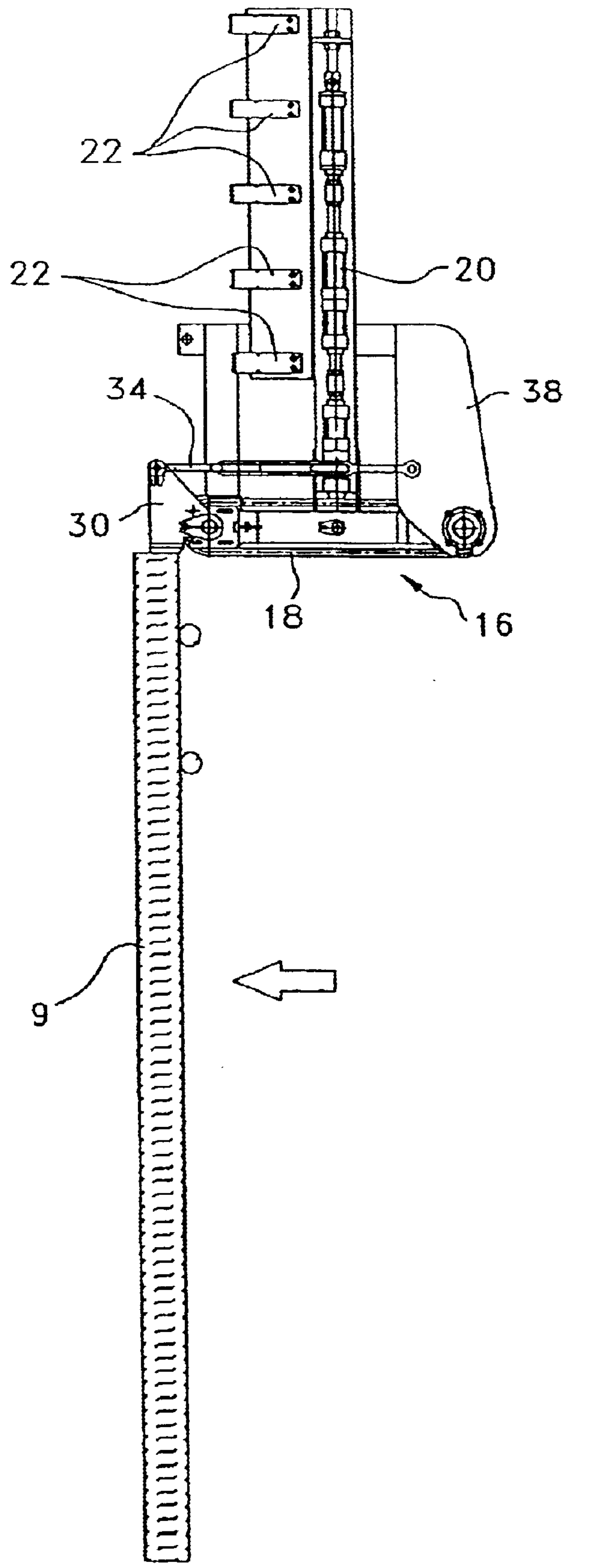
FIG. 3 is a top plan view of the first preferred embodiment in relation to an elongated piece, in a first operating position.
Figure 4:
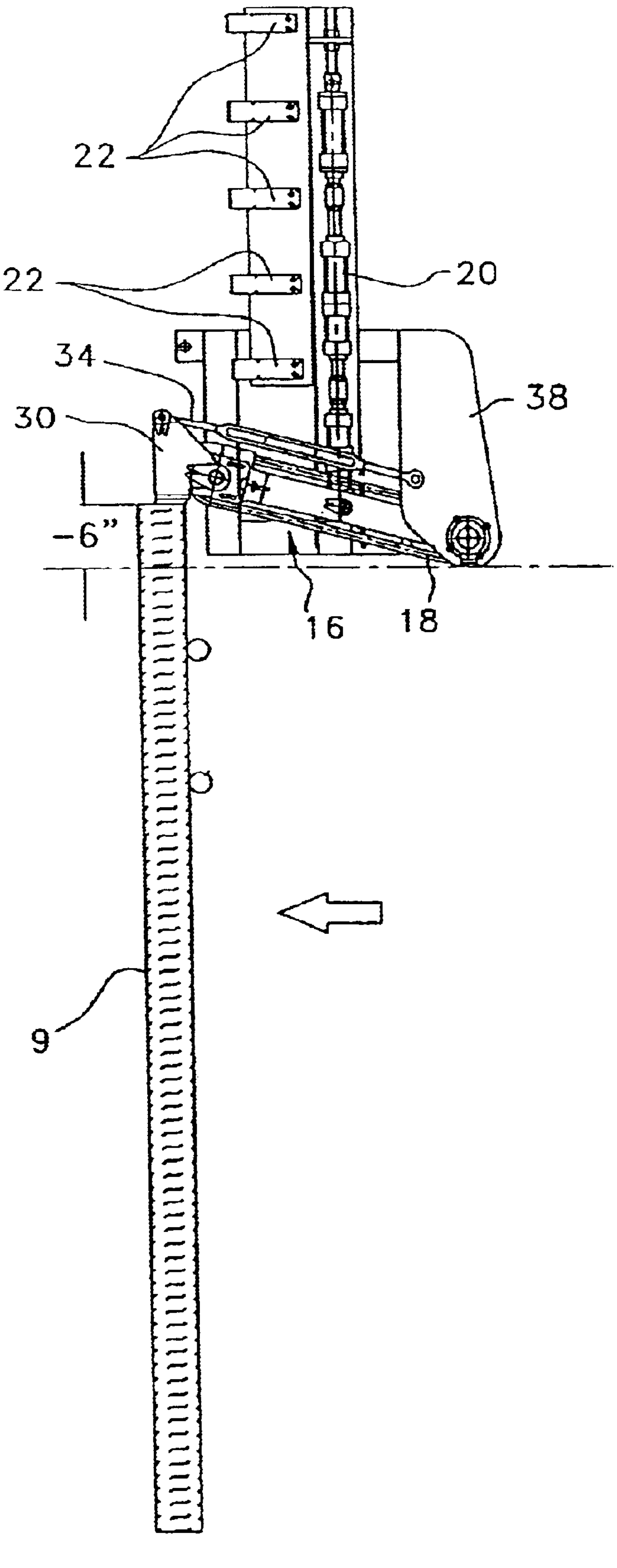
FIG. 4 is a top plan view of the first preferred embodiment in relation to an elongated piece, in a second operating position.
Figure 5:
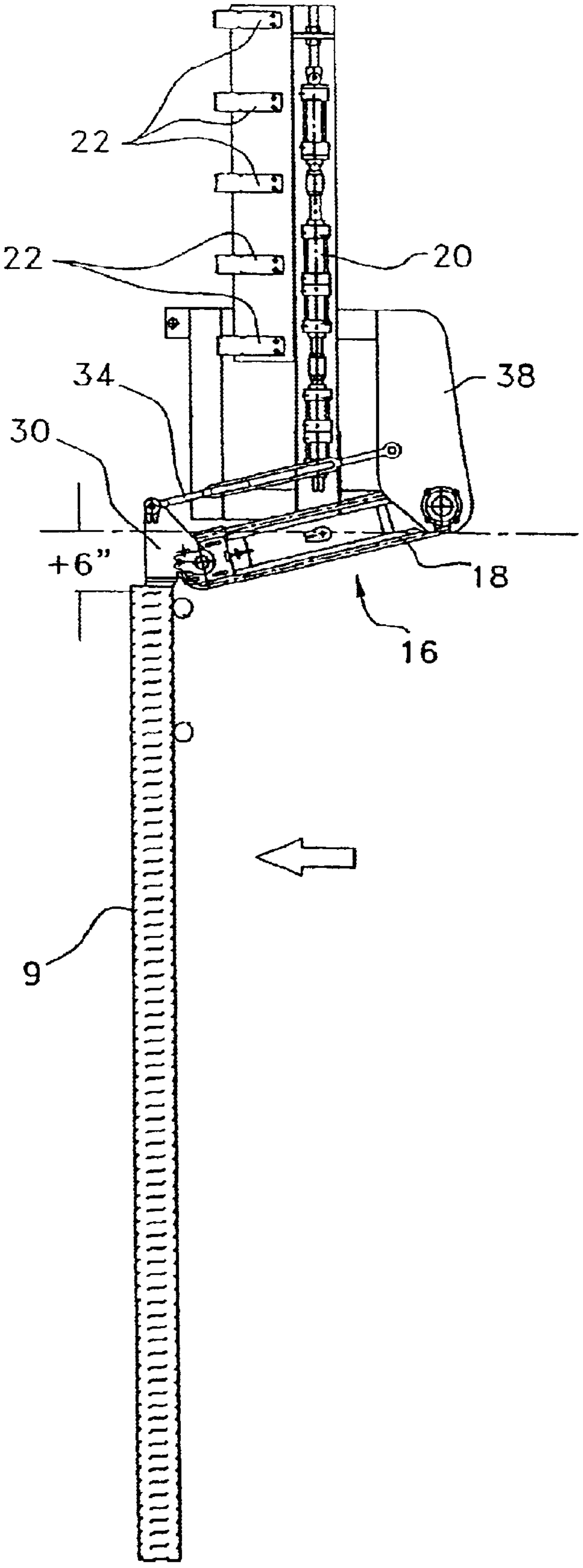
FIG. 5 is a top plan view of the first preferred embodiment in relation to an elongated piece, in a third operating position.
Figure 6:
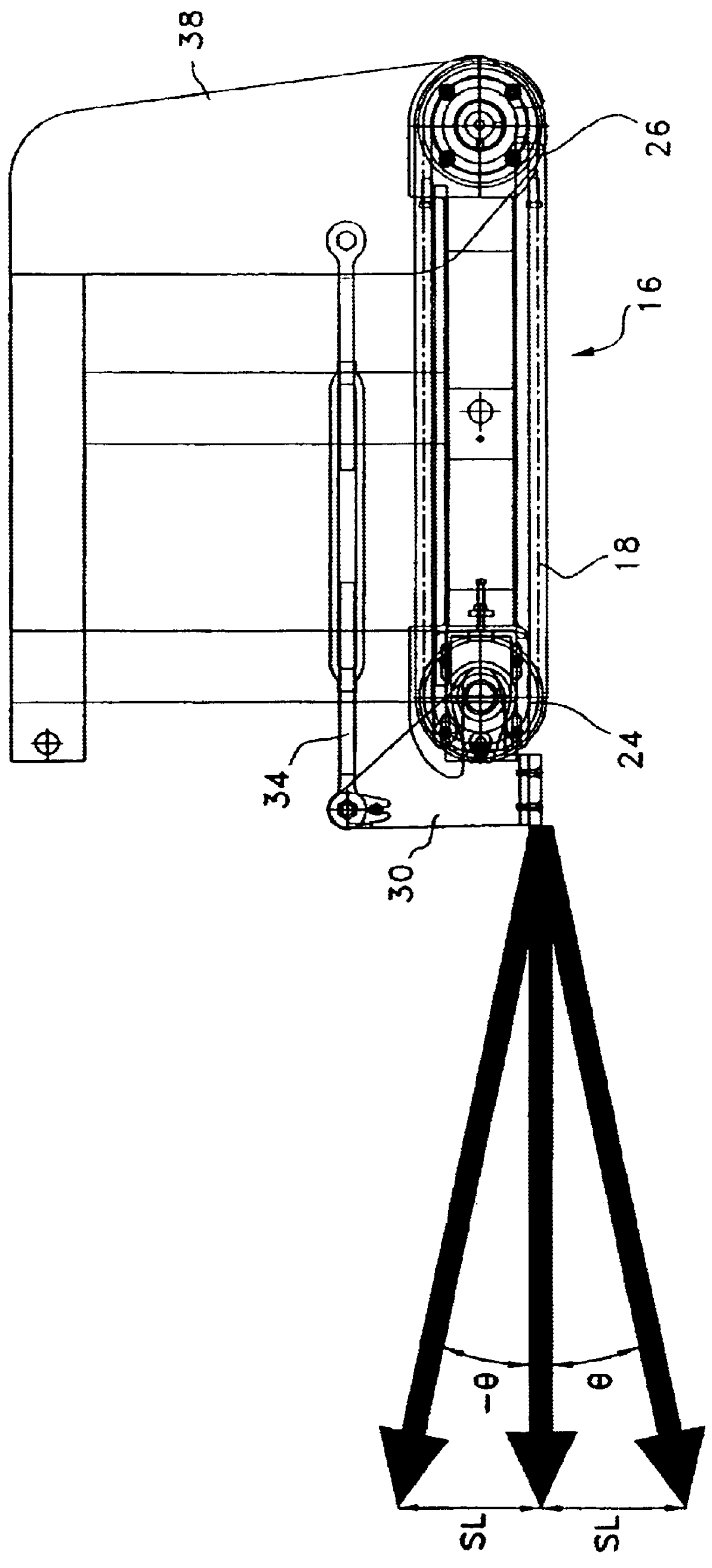
FIG. 6 is a schematic partial top plan view of the first preferred embodiment.

Preferably, the apparatus further comprises an element 30 with a flat surface 32 pivotally mounted at the free end of the arm 16, and a controllable rod 34 having an end pivotally connected to the element 30 for pivoting it when the arm 16 is pivoted to keep the flat surface 32 perpendicular to the elongated piece. The other end of the rod 34 is pivotally connected to a frame 38. With the embodiments shown in FIGS. 1 to 10, preferably, the values of SL and PL are chosen so that the angle $\theta$ is within a range of −15° to +15° as shown for example in FIGS. 3 to 5. In FIGS. 3, 4 and 5, there are shown the moving stops of the conveyor for pushing the lumber pieces along the process line. Only two stops are shown, but several stops are used along the transversal direction of the conveyor. In FIG. 3, the value of SL is 0" whereas it is −6" in FIG. 4 and +6" in FIG. 5.

Figure 7:
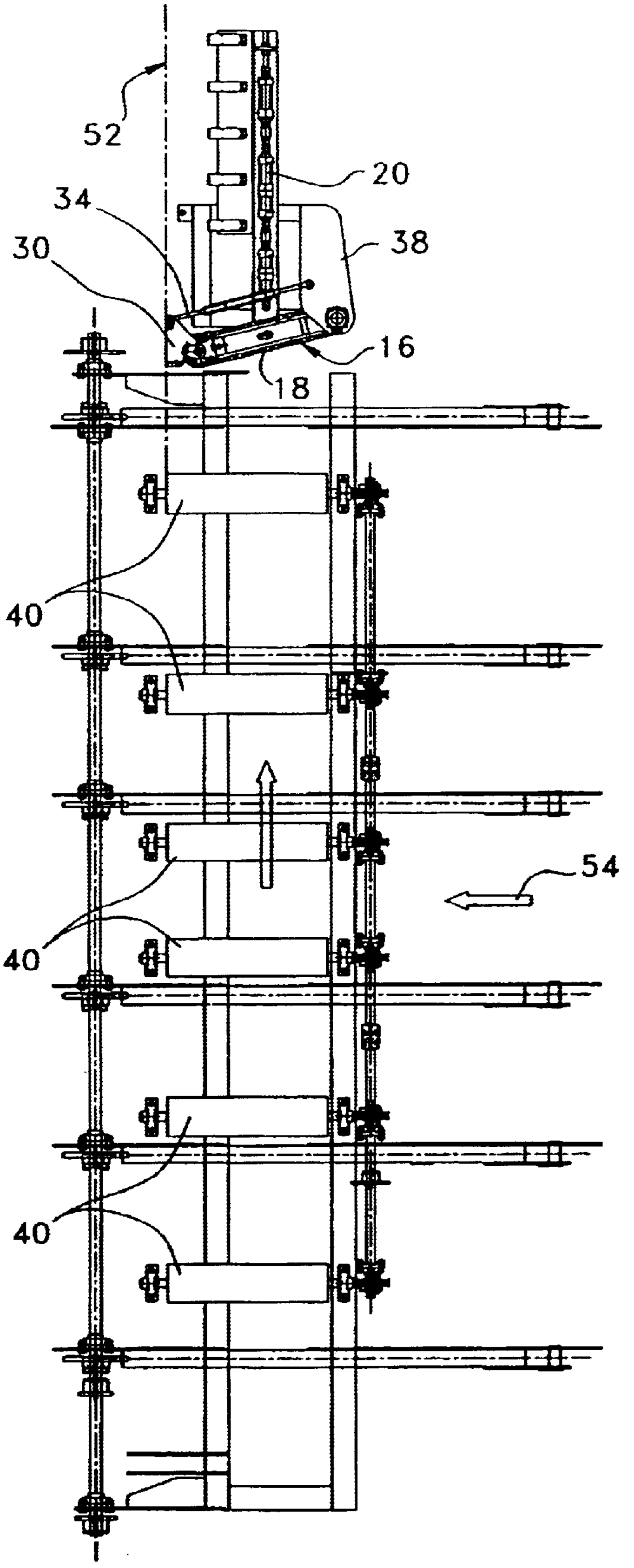
FIG. 7 is a top plan view of a part of a wood process line including the first preferred embodiment.
Figure 8:
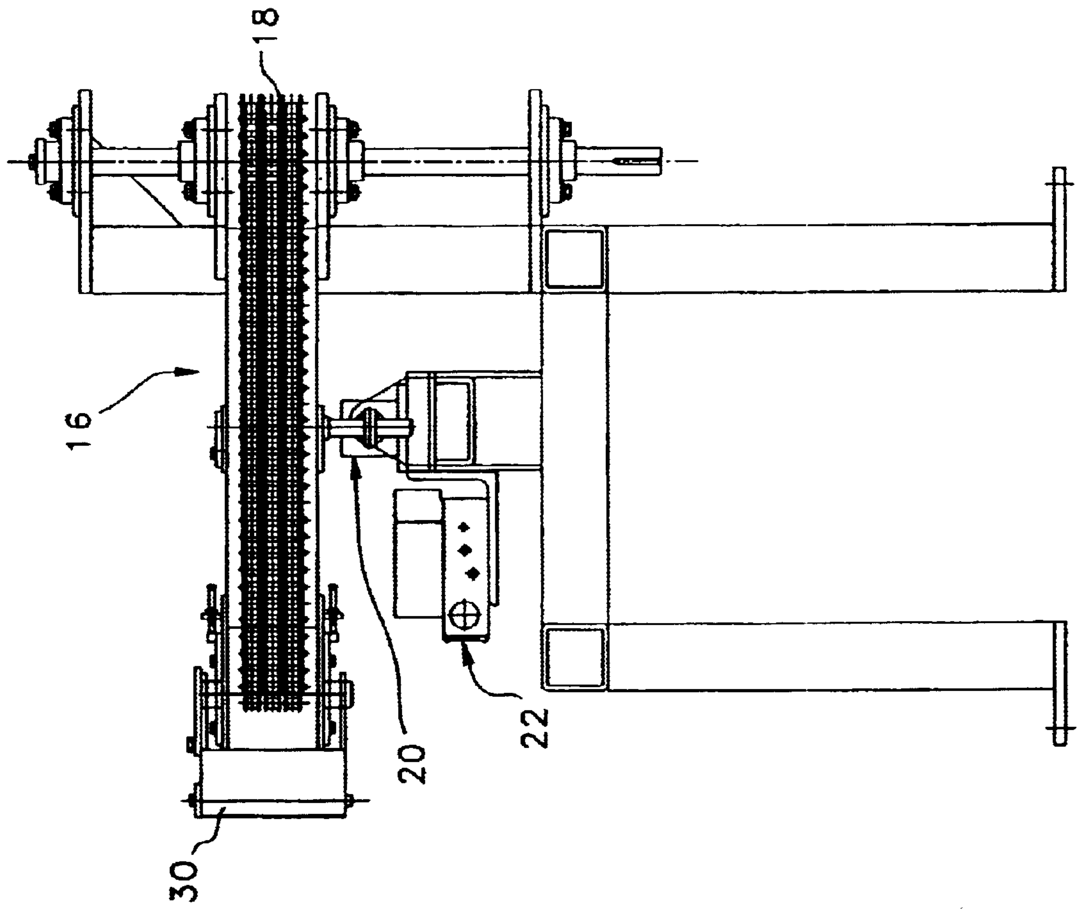
FIG. 8 is an elevational front view of the first preferred embodiment.
Figure 9:
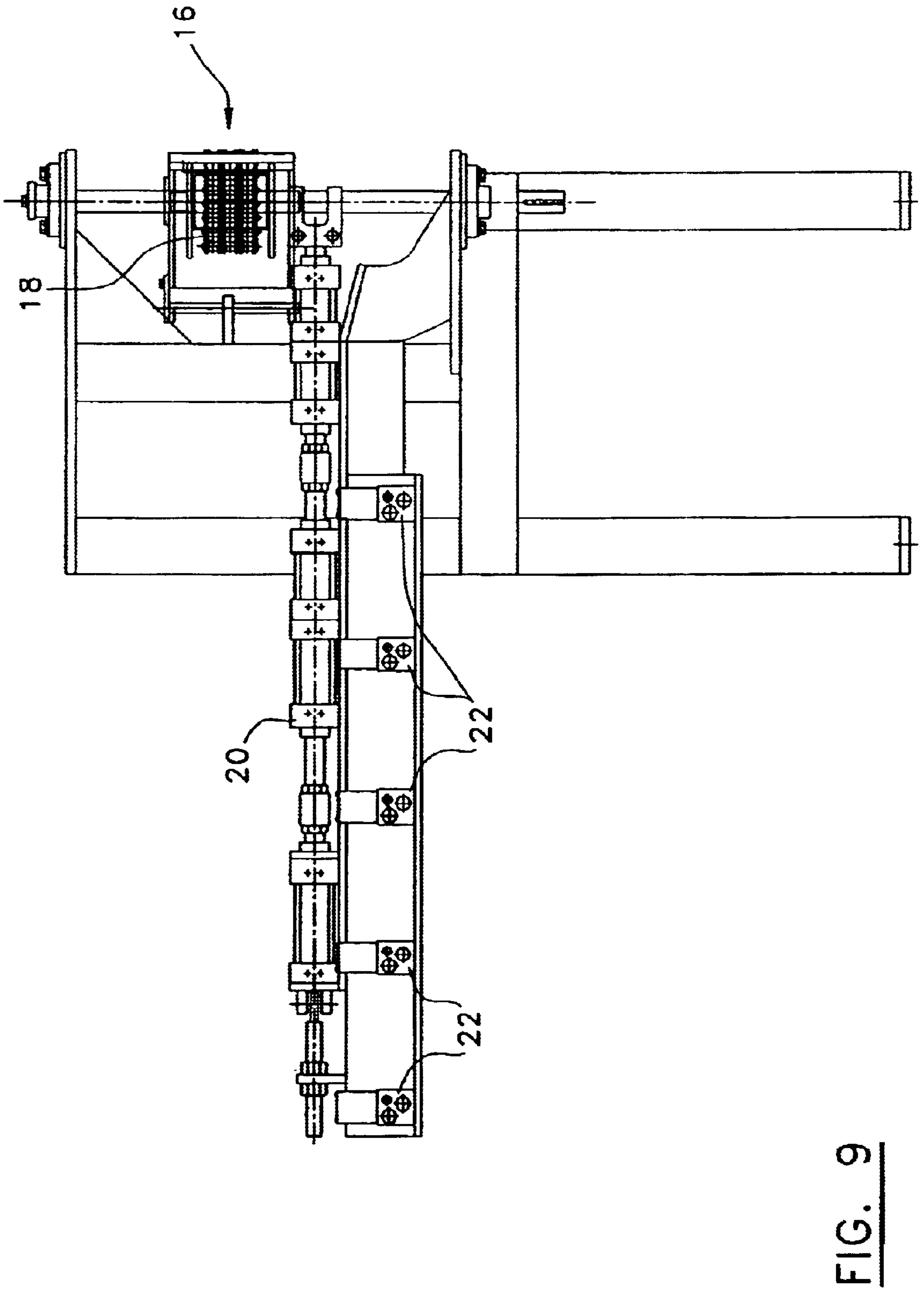
FIG. 9 is an elevational side view of the first preferred embodiment.
Figure 10:
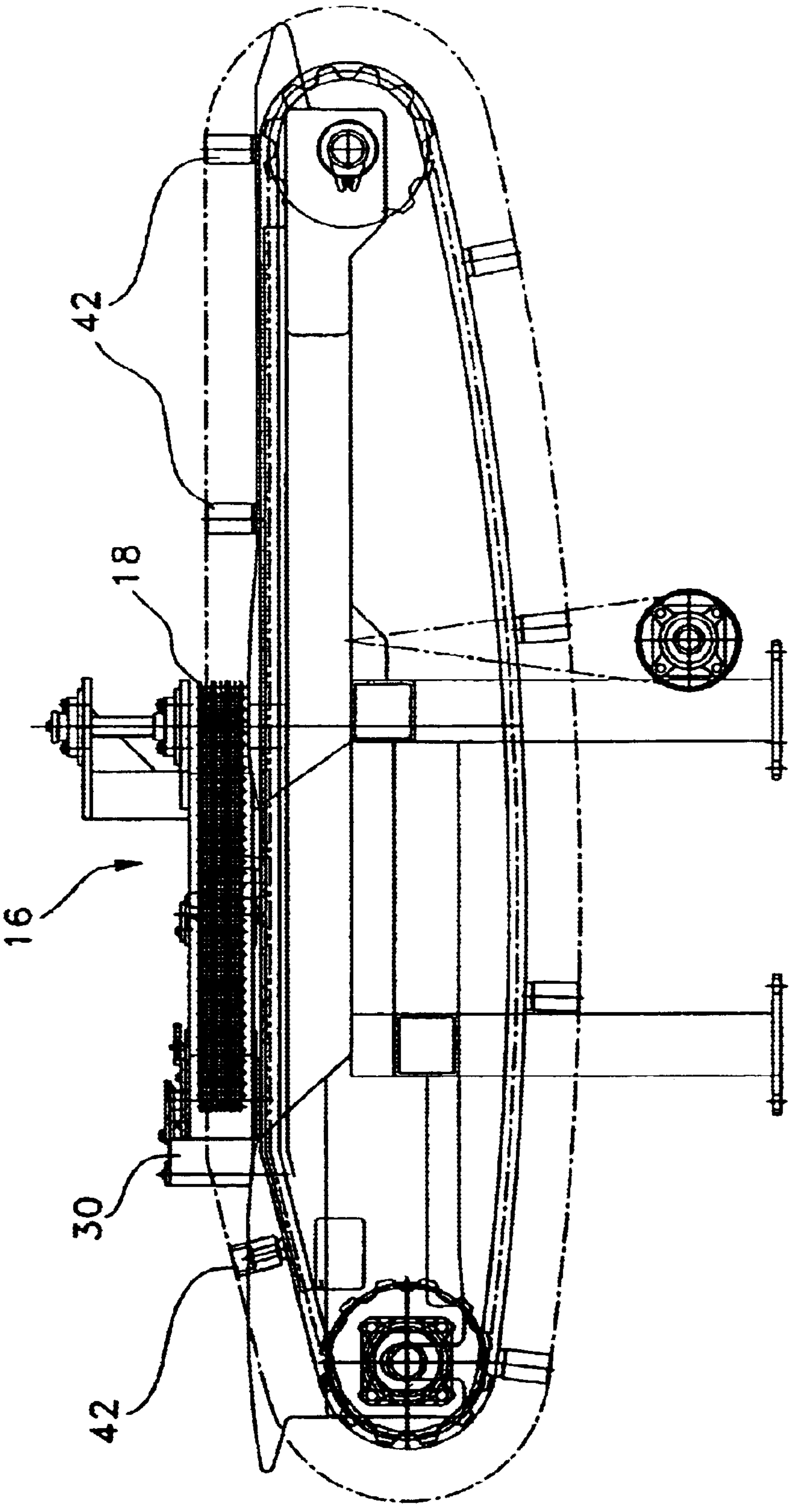
FIG. 10 is an elevational side view of a part of the wood process line where the first preferred embodiment is shown from the front.

Preferably, referring now to FIG. 7, the apparatus further comprises means for urging the elongated piece along its longitudinal direction against the arm 16. Still preferably, this means for urging comprises elongated rollers 40 for partially supporting the piece as it moves transversally, the rollers 40 extending transversally to the elongated piece to urge, when driven, the piece against the arm 16. The arrow 50 indicates the rotation direction of the rollers 40. The axis 52 shows that preferably one end of the rollers 40 is aligned with the rear surface of the element 30.

According to the present invention, there is also provided a method for controlling a longitudinal shifting of an elongated piece along a predetermined length SL as said piece moves transversally within the plane at a given speed PS. The method comprises steps of (a) providing a longitudinal arm 16 having a given length PL pivotable within the plane to shift the piece, and a flexible strap 18 operatively mounted around the arm 16 to contact the piece 9 as the arm is pivoted to shift the piece; (b) pivoting the arm 16 according to an angle $\theta$ determined in relation to the predetermined length SL and the given length PL of the arm 16 as shown for example in FIGS. 3, 4 and 5; and (c) driving the strap 18 around the arm 16 according to a speed SS determined in relation to the speed PS of the piece and the angle $\theta$ so that the longitudinal shifting is controlled. Preferably, the method further comprises a step of urging the piece along its longitudinal direction against the arm. This step of urging comprises a step of driving elongated rollers that partially support the piece as it moves transversally, the rollers 40 extending transversally to the elongated piece 9 to urge it against the arm 16.

Preferably, the method further comprises a step of providing an element 30 with a flat surface pivotally mounted at the free end of the arm 16 and pivoting the element by means of a controllable rod 34 to keep the flat surface 32 perpendicular to the elongated piece when the arm 16 is pivoted as shown for example in FIGS. 3, 4 and 5.

Preferably in step (b), the angle $\theta$ is determined by means of the following equation $\theta=\text{atan}[SL/PL]$. Also preferably, in step (a), values of SL and PL are chosen so that the angle θ is within a range of −15° to +15°. Also preferably, in step (c), the speed SS is determined by means of the following equation: SS=PS/cos θ.

Referring now to FIGS. 11 to 14, there is shown a second preferred embodiment of the present invention. The apparatus is used for controlling the longitudinal shifting of lumber pieces travelling transversally with respect to their length and at a given speed on a lug conveyor. The apparatus controls the longitudinal shifting of each lumber piece between a first datum line 60 located on the side of the conveyor, and a second datum line 62. The lumber pieces arrive at the level of the apparatus with one of their extremities aligned on the first datum line 60. The arm 16 extends along a horizontal plan. The arm 16 has a first extremity mounted in rotation on a driving shaft located on the side of the conveyor close to the first datum line 60. The arm 16 has a second end which is free and located downstream from the first extremity with respect the travel direction of the lumber pieces. The arm 16 has a side facing the conveyor, which is called driving side. Pulleys are mounted on both extremities of the arm 16. A flexible member such as for example a chain or strap is mechanically linked to the pulleys. The arm 16 pivots around its first extremity between a first position where the driving side of the arm 16 is in line with the first datum line 60, and a second position where the free end of the arm 16 is adjacent to the second datum line 62.

Like the first embodiment, the second embodiment also comprises a controllable pivoting means for pivoting the arm 16 between the first and second positions, and a controllable driving means for driving the flexible link and controlling its speed with respect to the speed of the conveyor.

Figure 11:
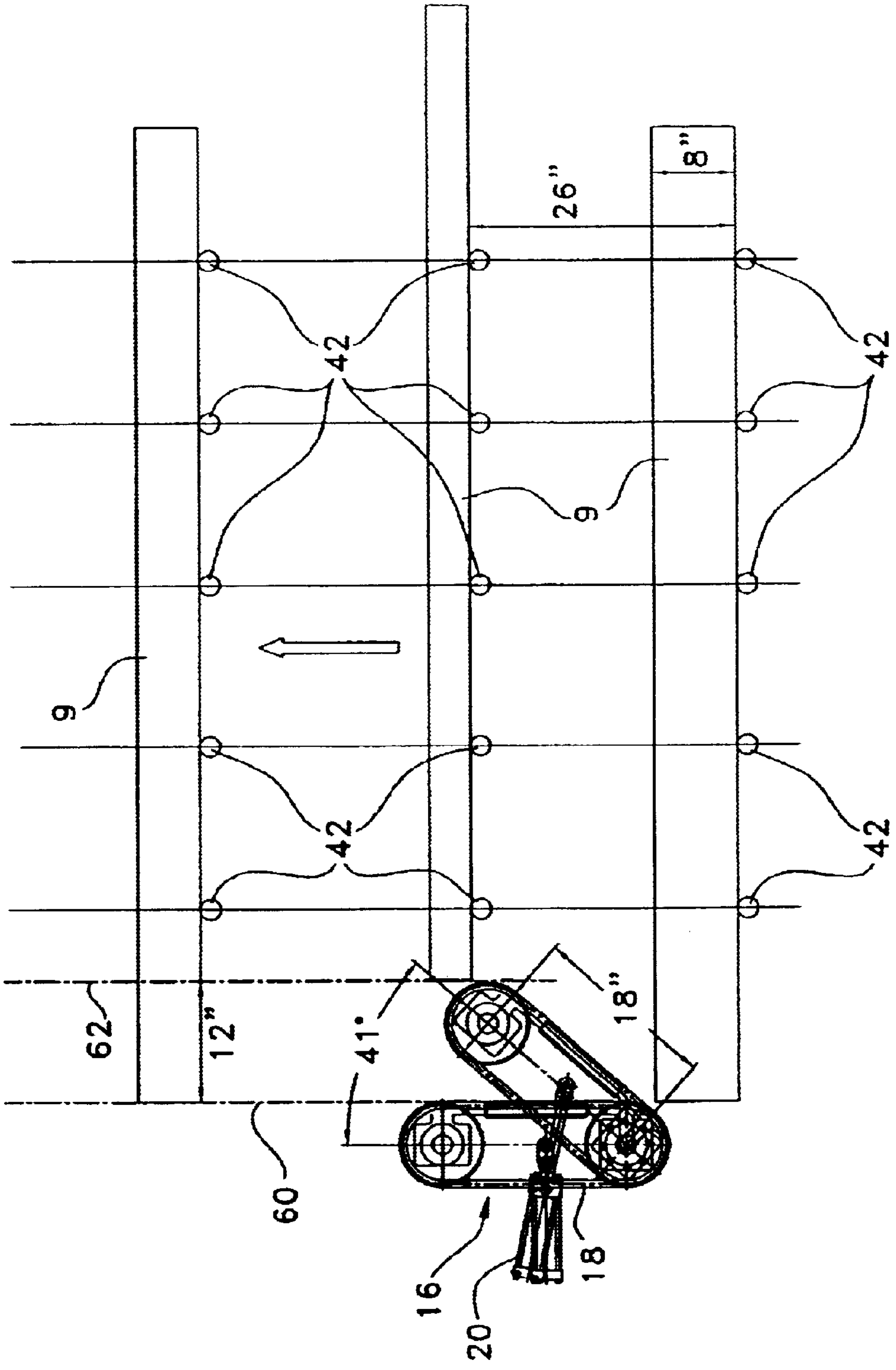
FIG. 11 is a top plan view of a part of a wood process line where a second embodiment of the present invention is shown.
Figure 12:
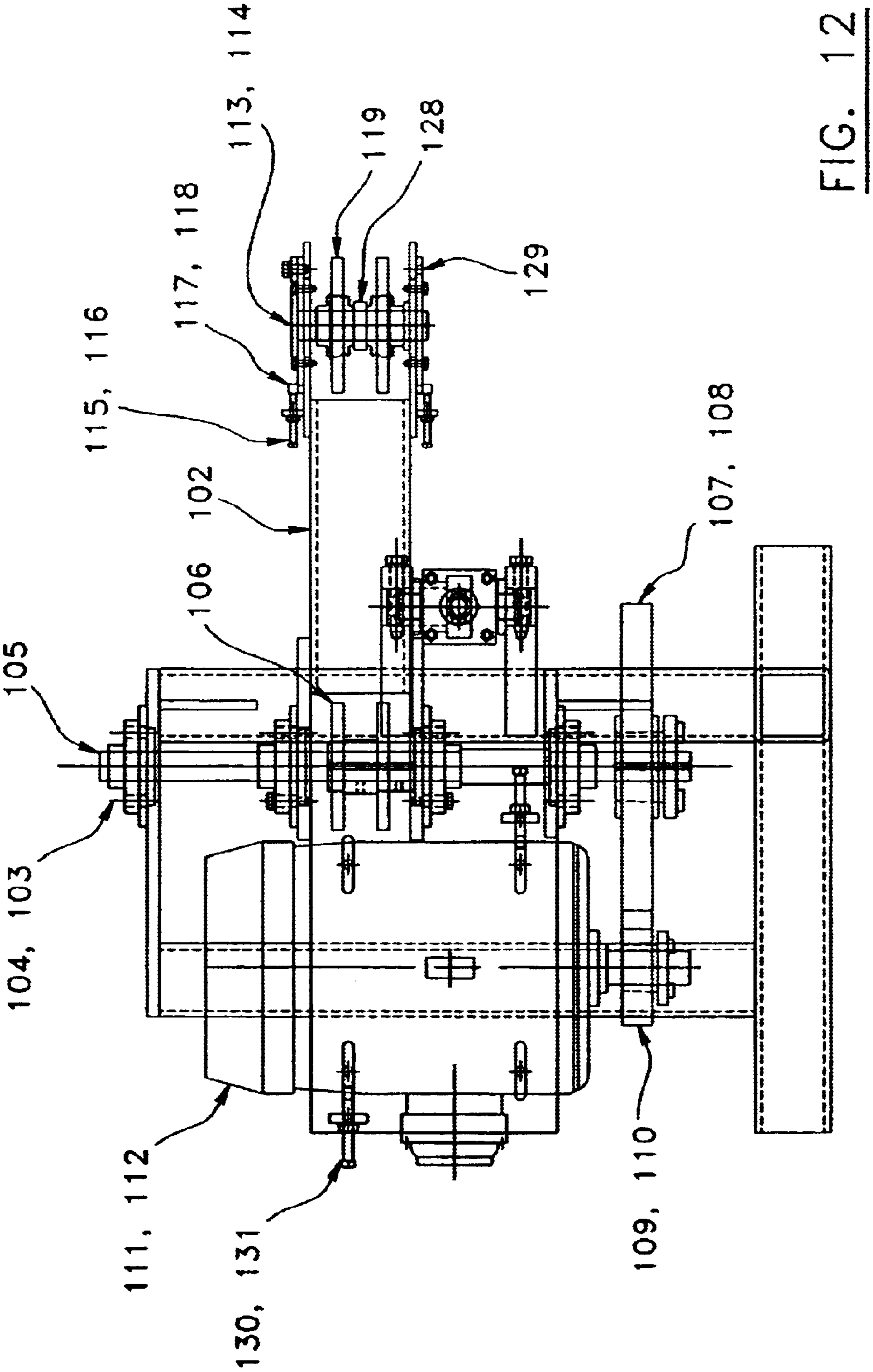
FIG. 12 is a front elevational view of the second embodiment of the present invention.
Figure 13:
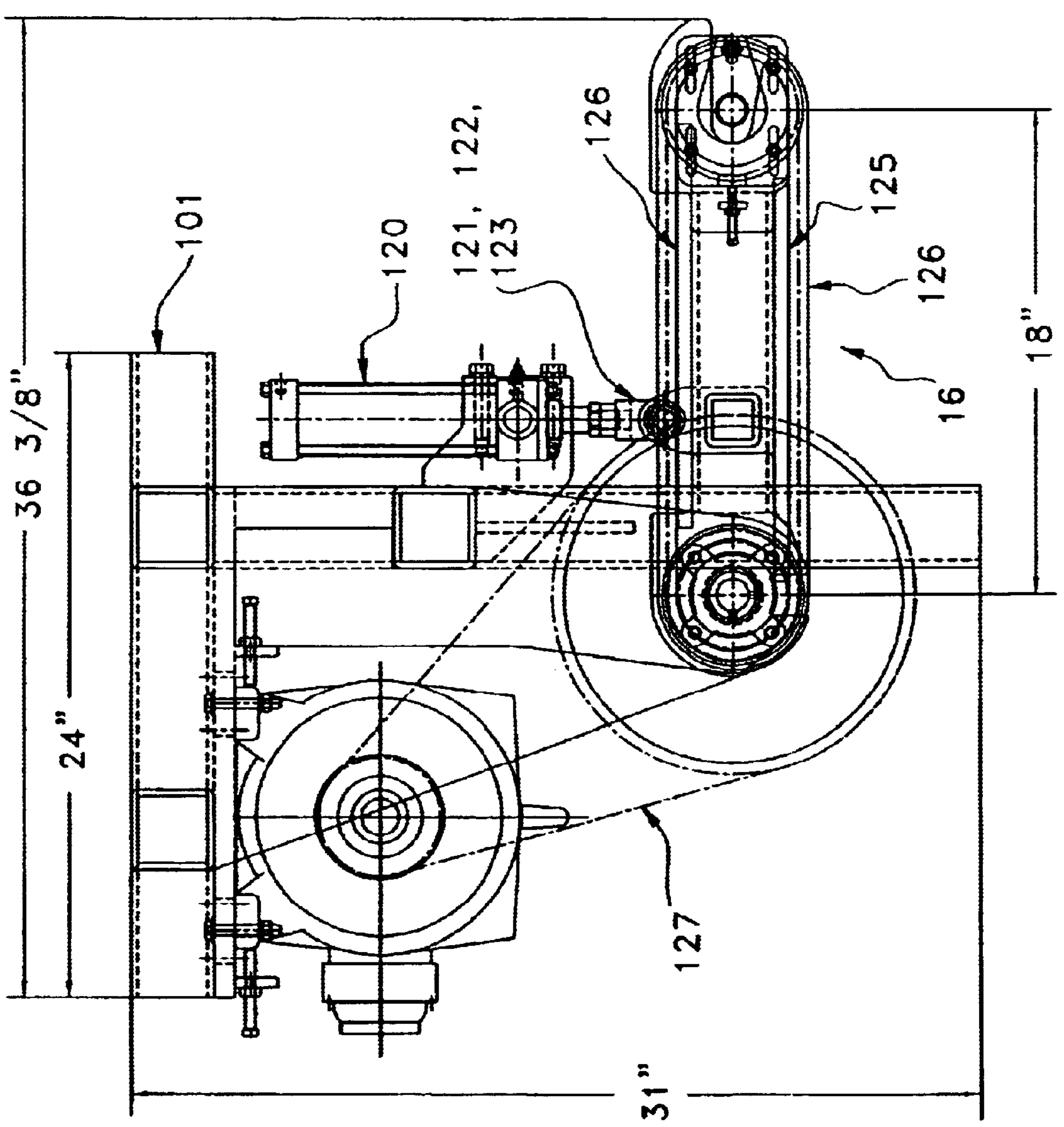
FIG. 13 is a top plan view of the second embodiment of the present invention.
Figure 14:
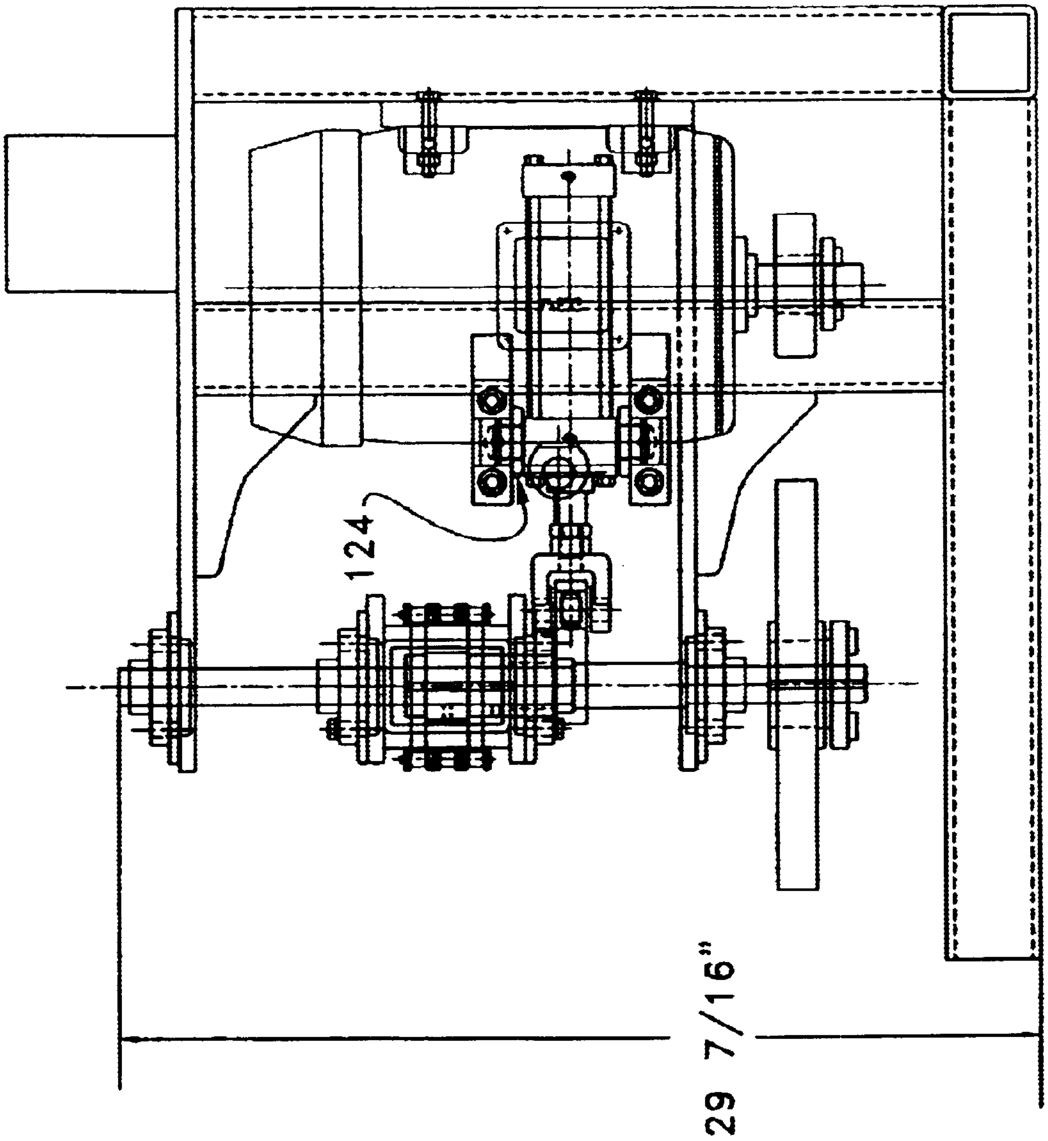
FIG. 14 is a side view of the second embodiment of the present invention.

In use, the lumber pieces arrive at the level of the apparatus with one of their extremities aligned on the first datum line 60. They can be longitudinally shifted by simply moving the motorized arm from its first position to another position. The flexible link mounted around the arm 16 allows a gradual easy displacement of each lumber piece in the longitudinal direction. Indeed, without such flexible link, the friction between the extremity of each lumber piece and the arm 16 would cause a restriction in the displacement of the lumber pieces. Such restriction would cause an unwanted oblique displacement thereof on the conveyor. In order to prevent such friction, the speed of the flexible link is preferably adjusted so that the transversal displacement of the lumber pieces is continuous. For example, as shown in FIG. 11, the angle θ is set to 41°, the arm length PL is 18 inches and the speed of the strap 18 is controlled so that its component in the direction indicated by the arrow is the same as the speed of the conveyor. However, if wanted, the speed of the flexible link can be adjusted to obtain a longitudinal shifting with a lateral shifting to obtain a predetermined oblique position. Therefore, for longitudinal shifting of the lumber pieces, the arm 16 is pivoted according to predetermined angle θ.

The controllable driving means is for example a micro-controller device that can adjust the speed of the strap, at any time, in relation with the speed of the conveyor. For this purpose, the driving pulley comprises a servo-motor comprising a driving shaft operatively connected by means of a flexible link to the driving shaft on which the first extremity of the arm 16 is mounted.

The controllable pivoting means for moving the arm between the first and second positions comprises a pneumatic cylinder 20 mounted on the side of the arm 16 opposite to the conveyor. The cylinder 20 is used for pivoting the arm 16 around the driving shaft. Depending on the pivoting angle of the arm, the lumber pieces will be positioned in relation to the saw trimmer. This arrangement offers a wide range of possible positions for the pneumatic cylinder 20 and thus, the longitudinal shifting of the lumber pieces with such apparatus is very flexible.

In use, the lumber pieces arrive one by one, aligned on the first datum line 60 but, before arriving at the level of the apparatus for controlling the longitudinal shifting, the lumber pieces are examined with an electronic control device such as the optimizer shown in FIG. 1. If the electronic control device gives no instructions, the apparatus will take a default value. For example, by default, the flexible strap 18 rotates in synchronisation with the conveyor so that its speed is the same as the speed of the transversal displacement of the lumber pieces of the conveyor. Also, in this case, by default, the arm is inclined in the first position at a pivoting angle of 0°.

As it can be appreciated by a person skilled in the art, the apparatus proposed herewith is very simple and requires a very limited space for its installation. For example, the size of the apparatus shown in FIGS. 11 to 14 can be approximately 24 inches. Please also find hereunder the list of the elements shown in FIGS. 12 to 14.

| | |
|---|---|
| 101 | main frame |
| 102 | frame for the ruler |
| 103 | bearings |
| 104 | bolt |
| 105 | driving shaft |
| 106 | double sprocket wheel |
| 107 | pulley |
| 108 | sleeve |
| 111 | motor |
| 112 | bolt |
| 113 | joining pin |
| 114 | bolt |
| 115 | bolt |
| 116 | nut |
| 117 | support for the joining pin |
| 118 | bolt |
| 119 | sprocket wheel |
| 20 | pneumatic cylinder |
| 121 | moving end of the cylinder |
| 122 | nut |
| 123 | pin |
| 124 | bearing |
| 125 | chain |
| 126 | teflon for the chain |
| 127 | strap |
| 128 | spacer |
| 129 | spacer |
| 130 | bolt |
| 131 | nut |
| 132 | valve |
| 133 | valve. |

What is claimed is:

1. Apparatus for controlling a longitudinal shifting of an elongated piece along a predetermined length SL as said piece moves transversely within a plane at a given speed PS, comprising:

a longitudinal arm having a given length PL pivotable within the plane to shift the piece;

a flexible link operatively mounted around the arm to contact the piece as the arm is pivoted to shift the piece;

a controllable pivoting means for pivoting the arm according to an angle θ determined in relation to the predetermined length SL and the given length PL; and a controllable driving means for driving the flexible link around the arm according to a speed SS determined in relation to the speed PS of the piece and the angle θ so that the longitudinal shifting is controlled.

2. Apparatus according to claim 1, further comprising means for urging the piece along its longitudinal direction against the arm.

3. Apparatus according to claim 2, wherein the means for urging comprise elongated rollers for partially supporting the piece as said piece moves transversally, the rollers extending transversally to the elongated piece to urge, when driven, the piece against the arm.

4. Apparatus according to claim 1, further comprising an element with a flat surface pivotally mounted at a free end of the arm, and a controllable rod having an end pivotally connected to the element for pivoting the element when the arm is pivoted to keep the flat surface perpendicular to the elongated piece.

5. Apparatus according to claim 1, wherein the controllable pivoting means comprise a pneumatic cylinder having an end pivotally connected to the arm, and several valves for controlling movement of the cylinder.

6. Apparatus according to claim 1, wherein the angle θ is determined by means of the following equation: $\theta = \text{atan}[SL/PL]$.

7. Apparatus according to claim 6, wherein values of SL and PL are chosen so that the angle θ is within a range of −15° to +15°.

8. Apparatus according to claim 6, wherein the speed SS is determined by means of the following equation: $SS = PS/\cos\theta$.

9. Apparatus according to claim 1, wherein the controllable drive means comprise two pulleys mounted at both ends of the elongated arm, one of the pulleys being a driving pulley.

10. Method for controlling a longitudinal shifting of an elongated piece along a predetermined length SL as said piece moves transversely within a plane at a given speed PS, comprising steps of:

(a) providing a longitudinal arm having a given length PL pivotable within the plane to shift the piece, and a flexible link operatively mounted around the arm to contact the piece as the arm is pivoted to shift the piece;

(b) pivoting the arm according to an angle θ determined in relation to the predetermined length SL and the given length PL of the arm; and (c) driving the flexible link around the arm according to a speed SS determined in relation to the speed PS of the piece and the angle θ so that the longitudinal shifting is controlled.

11. Method according to claim 10, further comprising a step of urging the piece along its longitudinal direction against the arm.

12. Method according to claim 11, wherein the step of urging comprises a step of driving elongated rollers that partially support the piece as said piece moves transversally, the rollers extending transversally to the elongated piece to urge the piece against the arm.

13. Method according to claim 10, further comprising steps of:

providing an element with a flat surface pivotally mounted at a free end of the arm, and pivoting the element by means of a controllable rod to keep the flat surface perpendicular to the elongated piece when the arm is pivoted.

14. Method according to claim 10, wherein, in step b), the angle θ is determined by means of the following equation: $\theta = \text{atan}[SL/PL]$.

15. Method according to claim 14, wherein, in step a), values of SL and PL are chosen so that the angle θ is within a range of −15° to +15°.

16. Method according to claim 14, wherein, in step c), the speed SS is determined by means of the following equation: $SS = PS/\cos\theta$.

* * * * *